(12) United States Patent
Rubenstein

(10) Patent No.: US 6,802,680 B1
(45) Date of Patent: Oct. 12, 2004

(54) TORQUE LIMITING FASTENER

(75) Inventor: Brandon Aaron Rubenstein, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/760,737

(22) Filed: Jan. 20, 2004

(51) Int. Cl.[7] .......................... F16B 31/00; F16B 33/04
(52) U.S. Cl. .......................... 411/7; 411/383; 411/403; 411/908; 411/919
(58) Field of Search ................ 411/3–7, 383, 411/402–404, 908, 919

(56) References Cited

U.S. PATENT DOCUMENTS

| 3,289,524 | A | * | 12/1966 | Rubin | 411/7 |
| 3,425,314 | A | * | 2/1969 | Ohlson | 411/7 |
| 5,020,949 | A | * | 6/1991 | Davidson et al. | 411/3 X |
| 5,154,557 | A | * | 10/1992 | Houck | 411/7 |

FOREIGN PATENT DOCUMENTS

| EP | 287381 | * 10/1988 | 411/3 |

* cited by examiner

Primary Examiner—Neill Wilson

(57) ABSTRACT

A torque limiting fastener includes a fastener body and a fastener head insert configured to fit within the fastener body and to transfer a limited amount of torque to the body. The fastener body has a head with a bore formed therein and having a first set of protrusions. The fastener head insert has a tool interface for accepting a mounting tool and a perimeter edge onto which a second set of protrusions are disposed. A torque applied to the tool interface region will rotate the fastener head insert within the bore and cause the second set of protrusions to engage with the first set of protrusions to transfer torque to the fastener body. If the applied torque exceeds a limiting value, the second set of protrusions will fail to maintain engagement with the first set of protrusions and the fastener head insert will rotate without transferring the excessive torque.

19 Claims, 5 Drawing Sheets

TORQUE LIMITING FASTENER

BACKGROUND OF THE INVENTION

1. Field of the Invention

The invention relates to fasteners for securing objects together. More specifically, a torque limiting fastener is presented to regulate the amount of torque that may be applied to such fasteners.

2. Discussion of the Related Art

It may be desirable to limit the amount of torque that can be applied to a screw-type fastener by a mounting tool when securing objects together, particularly in a hardware setting. Excessive torque can damage the integrity of the threads of the fastener by causing the threads to shear off inside of a threaded bore or it can damage the objects if they have inferior strength or hardness as compared to the fastener. Another common problem is the stripping of the tool interface on the head of the fastener, e.g., the slot into which a flat-head screwdriver fits, hampering the ability of the tool to turn the fastener. The problems of excessive torque, though, must be balanced against the need for sufficient tightening of the fastener to rigidly couple the fastener with the objects to be mounted.

Two common methods for limiting the torque borne by a fastener include: (a) using a torque-limiting tool to secure the fastener to the mounted objects; and (b) using a fastener designed with torque-limiting features. While torque-limiting tools are reliable, they also are expensive compared to simple mounting tools, such as standard screwdrivers, and may not be configured to work with fasteners having varying head geometries. Fasteners that have torque-limiting features have been designed to work with at least some standard mounting tools, such as socket wrenches. Examples of these types of fasteners are shown in U.S. Pat. No. 5,256,015, issued to St. Clair, and U.S. Pat. No. 5,713,705, issued to Grünbichler. However, many of these types of fasteners are for one-time use and have component parts that break-off or otherwise fail when a predetermined amount of torque is applied, thus making it difficult, if not impossible, to remove the fastener once installed.

SUMMARY OF THE INVENTION

A screw-type fastener is provided having features for limiting the amount of torque that can be applied to the fastener to a predetermined value. The fastener is also configured to allow for easy removal from mounting with objects so that the fastener can be reused. Standard mounting tools may be used to install and remove the fastener from such mounting.

The torque limiting fastener comprises a fastener body with a threaded shaft, a head, and a bore formed in the head. The fastener further comprises a head insert sized to fit within the bore. The head insert has a central tool interface region configured to accept a variety of mounting tools for the application of torque to the insert.

A first set of protrusions are formed on an exterior portion of the sidewall of the bore and a second set of protrusions are formed on a perimeter wall of the head insert and are mateable with the first set of protusions. Upon the application of a torque to the head insert below a certain predetermined value, the first set of protusions transfers this torque to the second set of protrusions and rotate the fastener body, and consequently, rotate the shaft into a threaded bore for tightening. Once the applied torque exceeds a torque-limiting value, one of the first and second set of protrusions elastically deform and fail to maintain engagement. Continued over-torquing will not cause rotation of the fastener body in the tightening direction, thus protecting the structural integrity of the fastener and the mounted objects.

The torque-limiting features of the first and second sets of protrusions are realized by configuring one of the sets of protrusions to deflect and slip over the other set of protrusions at the torque limiting value. In one aspect, the first set of protrusions on the fastener body take the form of nubs and the second set of protrusions on the fastener head insert take the form of vanes that are configured for deflection. In another aspect, the position of the nubs and deflecting vanes are reversed such that the nubs are on the fastener head insert and the deflecting vanes are on the fastener body.

To allow for removal of the fastener body from mounting engagement with the objects, the fastener head insert must transfer torque and resulting rotation to the fastener body in a loosening direction opposite of tightening direction. If the fastener body is tightened with a torque that equals or exceeds the limiting value, the first and second set of protrusions will likewise fail to rotationally engage in the loosening direction. Therefore, a wedge and a corresponding wedge-shape recess are implemented to provide a mating surface that can transfer sufficient torque to the fastener body to unscrew the body from the mounting position within the objects. In one aspect, the fastener head insert has the wedge formed on a bottom surface of the insert and the fastener head has the wedge-shaped recesses formed into a recessed base surface of the head. In another aspect, the fastener head insert has the wedge-shaped recess formed into the insert bottom surface and the fastener head has the wedge formed on the recessed base surface.

DETAILED DESCRIPTION OF THE INVENTION

Figure 1:
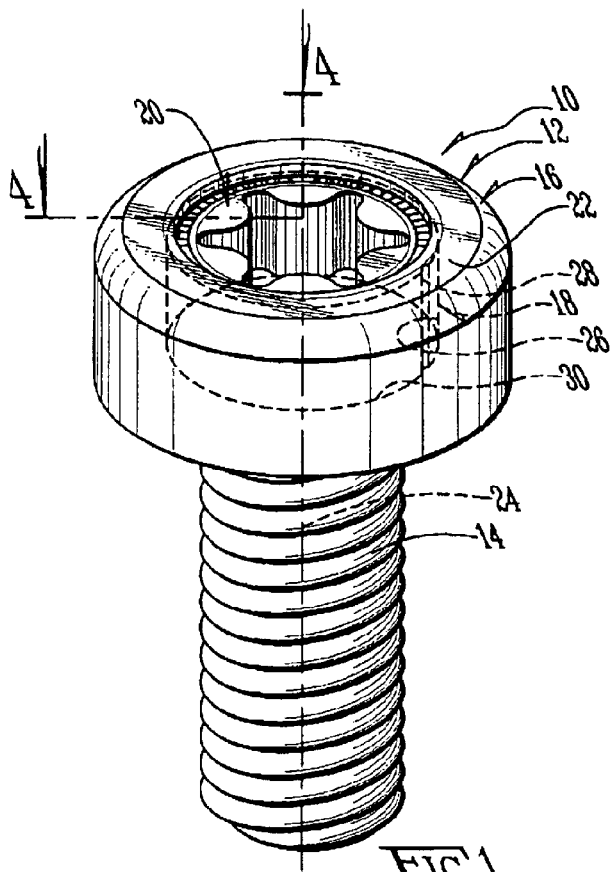
FIG. 1 is an exploded view of an exemplary torque limiting fastener of the present invention showing the fastener head insert and the fastener body.

A torque limiting fastener in accordance with an embodiment of the present invention is indicated generally at 10 in FIG. 1. The fastener 10 comprises a fastener body 12 having a threaded shaft 14, a head 16 and a bore 18 extending into the head 16. The fastener further comprises a head insert 20 sized to fit within the bore 18 and configured to receive standard mounting tools to install and remove the fastener 10 from an assembly. The threaded shaft 14 of the fastener may be of any conventional size, and may include any conventional thread pitch and profile without departing from the scope of the invention.

Figure 4:
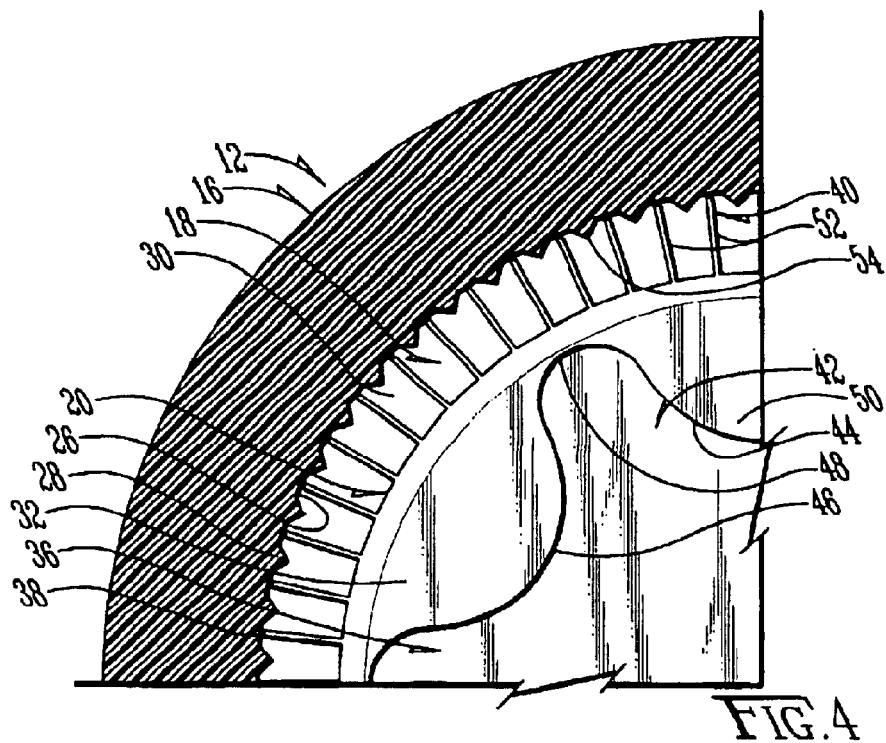
FIG. 4 is a cross-sectional view taken along line 4—4 showing the engagement of the first set of protrusions and the second set of protrusions.

Bore 18 of the fastener extends inwardly from a top surface 22 of the head 16 in a direction along a longitudinal axis 24 of the body 12. The bore 18 has an interior sidewall surface 26 and a base surface 30 on which fastener head insert 20 is seated. As shown in FIG. 4, at least a portion of the interior sidewall surface 26, and preferably the entire interior sidewall surface, is configured with a first set of protrusions or teeth 28. The teeth 28 preferably extend longitudinally along the length of the bore. It is to be understood that the teeth 28 may extend for only a portion of the longitudinal length of the bore or extend for only a portion of the circumference of the interior sidewall surface 26 without departing from the scope of the present invention. Preferably, bore 18 is concentrically aligned with the threaded shaft 14 and shares longitudinal axis 24 with fastener body 12. This configuration ensures that torque applied to a sidewall 26 formed by the bore 18 is balanced around the threaded shaft 14.

The head insert 20 is sized to be mateably received by bore 18. The insert has a top surface 32, a bottom surface 34, a tool interface region 36, and an outer perimeter surface 38 formed with a second set of protrusions, or teeth 40. The teeth 40 of the head insert are dimensioned to mateable engage teeth 28 of the fastener body 12. This engagement of the first and second set of teeth 28, 40, respectively, enables the transfer of torque from the head insert 20 to the fastener body 12 upon rotation of the fastener head insert 20 within the bore 18 in a tightening direction (e.g., clockwise) or a loosening direction (e.g., counter-clockwise). The diameter of the fastener head insert 20 including the second set of protrusions 40 is slightly less than the diameter of the bore 18 between the first set of protrusions 28 for smooth rotation and torque transfer between the insert 20 and the fastener body 12. Preferably, the fastener head insert 20 is a symmetrical body such that when the insert 20 is positioned within the bore 18, the insert 20 shares the longitudinal axis 24 with the fastener body 12. The head insert 20 preferably is made of plastic. It is to be understood that the head insert could be made of other materials.

Figure 2:
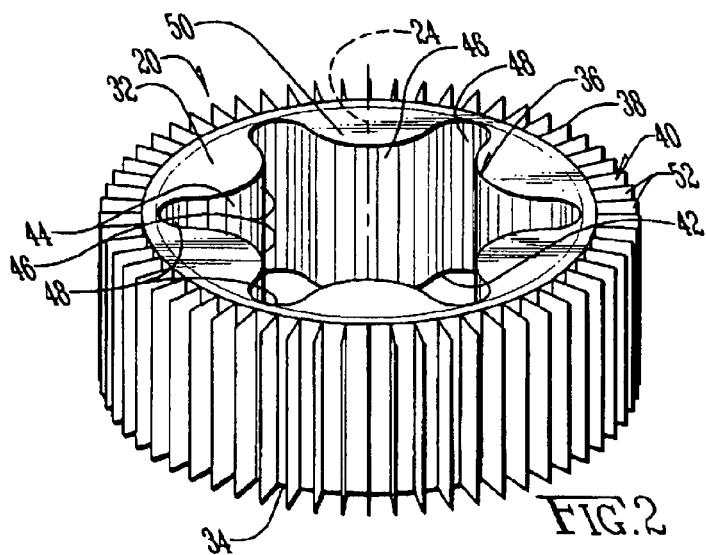
FIG. 2 is a top perspective view of the fastener head insert shown in FIG. 1.

As shown in FIG. 2, the tool interface 36 of the head insert 20 preferably has a patterned geometry for accepting certain standard mounting tools therein, such as a flat-head screw driver, a Phillips head screw driver, or a multi-faceted wrench (e.g., a hex wrench). The tool interface 36 comprises a through-hole 42 extending from the top surface 32 inwardly to bottom surface 34. In an alternative arrangement, the tool interface 36 comprises a recess in the top surface 32 that extends inwardly partially, but not to the bottom surface 34. A sidewall 44 is defined by the through-hole or recess 42 to which a mounting tool applies a torque on the bead insert 20. The sidewall 44 preferably has a shape formed by a series of alternating ridges 46 and troughs 48 extending towards and away, respectively, from the longitudinal axis 24. The tool interface 36 may have any number of ridges 46 and troughs 48 depending on the particular mounting tools that are to be used with the fastener head insert 20. For example, FIG. 2 shows the interface 36 having a series of six ridges 46 and six troughs 48 such that a flat head screwdriver inserted into opposing troughs 48, or a hex wrench inserted to contact a peak 50 of the ridges 46, may apply torque to the insert 20. As another example, if the interface 36 has a series of four ridges and troughs, a Phillips screwdriver can be inserted into the troughs 48 for applying torque to the insert 20. Whether the through-hole 42 or recess configuration is used, the sidewall 44 should be sized with a height to create a sufficient surface area of contact with the mounting toot to transmit the desired torque that the tool will apply to the fastener head insert 20.

The first and second set of teeth 28, 40 are designed such that once a preselected value of torque is applied to the fastener head insert 20, one of the first and second set of protrusions will elastically deform and slip over the other set of protrusions to disengage the mated teeth. This preselected value, or limiting torque determines the necessary bending capacity for the teeth of one of the first and second set of teeth, 28, 40. The limiting torque is reached as the threaded shaft 14 rotates in a tightening direction into a threaded bore of assemblies (not shown) to be mounted or coupled together. The limiting torque is chosen as to maintain the structural integrity of the fastener body 12, the fastener head insert 20, the mounted objects and/or the mounting tool while at the same time providing sufficient tightening of fastener to secure the objects coupling function.

Figure 3:
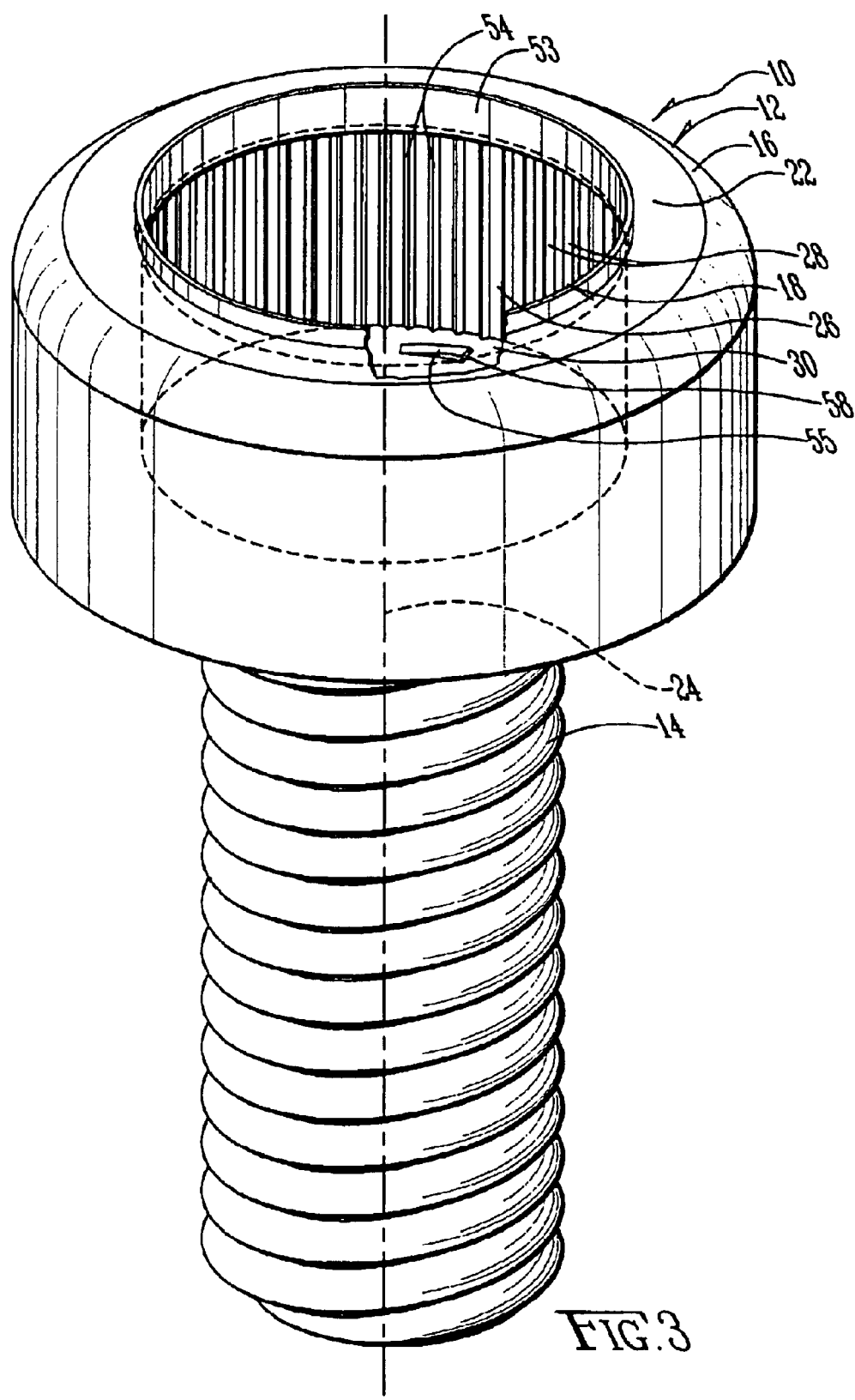
FIG. 3 is a close-up perspective view of the fastener body shown in FIG. 1 showing the first set of protrusions and the wedge.

An exemplary arrangement of the present invention is to provide radially-extending thin teeth or vanes 52 as the second set of protrusions, as shown in FIG. 2, and relatively short annular gear teeth or nubs 54 as the first set of protrusions, as shown in FIGS. 3 and 4. The spatial relationship between the radially-extending vanes 52 and the nubs 54 is shown in FIG. 4. In this arrangement, the radially-extending vanes 52 transfer the torque applied to the insert 20 to the nubs 54 formed on the fastener body 12, thus turning the body 12. Upon the limiting torque being reached, the vanes 52 deflect inwardly toward the perimeter surface 38 of the insert 20 and slip over nubs 54 of fastener body 12. Even as an individual, resilient vane 52 contacts the next successive nub 54 in rotation, the torque needed to continue rotation of the threaded shaft 14 in the tightening direction will exceed the limiting torque and the vane will again deflect and, thus, further rotation of the fastener body 12 is avoided.

To select the desired limiting torque, the geometry and stiffness of the radially-extending vanes 52 and nubs 54 are adjusted. For example, by adjusting the thickness and stiffness of a particular material forming the radially-extending vanes 52, the vanes will deflect at differing amounts of resistive bending force encountered through engagement with the nubs 54. The nubs 54 also present a surface positioned at an angle with respect to a contacting side of the vanes 52 to control the limiting torque. The nubs 54 could, for example, take the shape of a half-circle or half-cylinder, or as shown in FIG. 4, may be triangular in shape.

Figure 5:
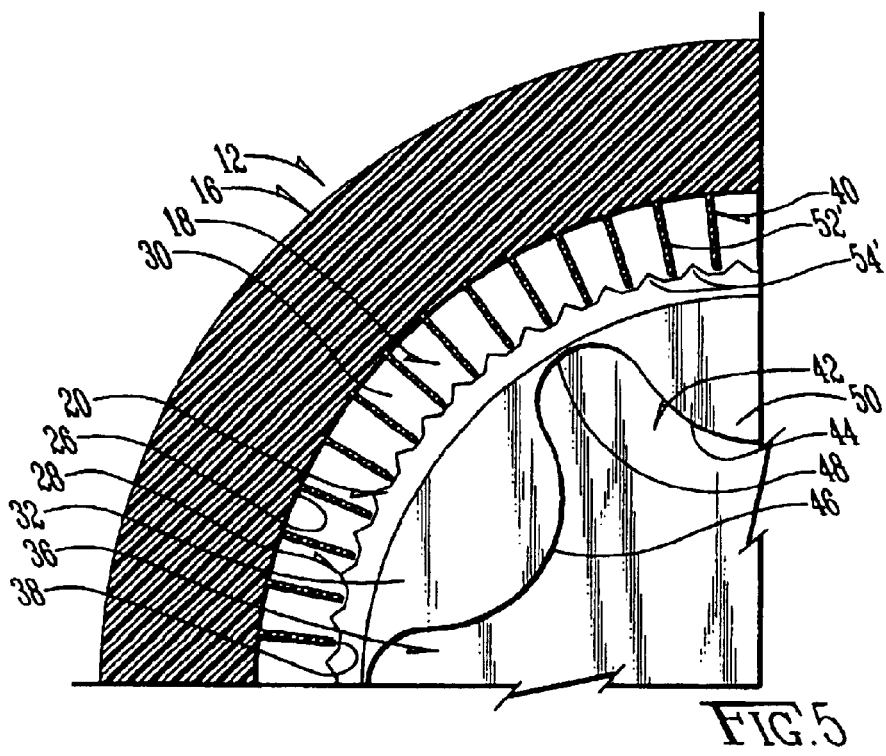
FIG. 5 is an exploded view of another exemplary embodiment of the torque limiting fastener showing the fastener head insert and the fastener body.

FIG. 5 shows another arrangement for the first and second set of protrusions 28, 40 where the location of the radially-extending vanes 52 and nubs 54 are reversed. The first set of protrusions 28 on the fastener body 12 are formed as radially-extending vanes 52' and the second set of protrusions 40 on the fastener head insert 20 are formed as nubs 54'. This arrangement provides the same functionality as the torque limiting fastener 10 of FIG. 1, except that torque is transferred from the nubs 54' of the fastener head insert 20 to the vanes 52' of the fastener body 12. Upon the torque limiting value being reached, the vanes 52' deflect somewhat outward towards the sidewall 26 of the fastener body 12 and slip over the nubs 54' of the fastener head insert 20.

As shown in FIG. 3, a flange 53 preferably extends from the top surface 22 of the fastener body 12. The flange 53 crimps down over at least a portion of the second set of protrusions 40 of the fastener head insert 20 once the insert 20 is placed within the bore 18 of the fastener body 12. The flange 53 thus maintains the fastener head insert 20 within the fastener body 12 such that a torque applied to the insert 20 will not pull it out of the bore 18 and lose the engagement between the protrusions 28, 40.

Figure 6:
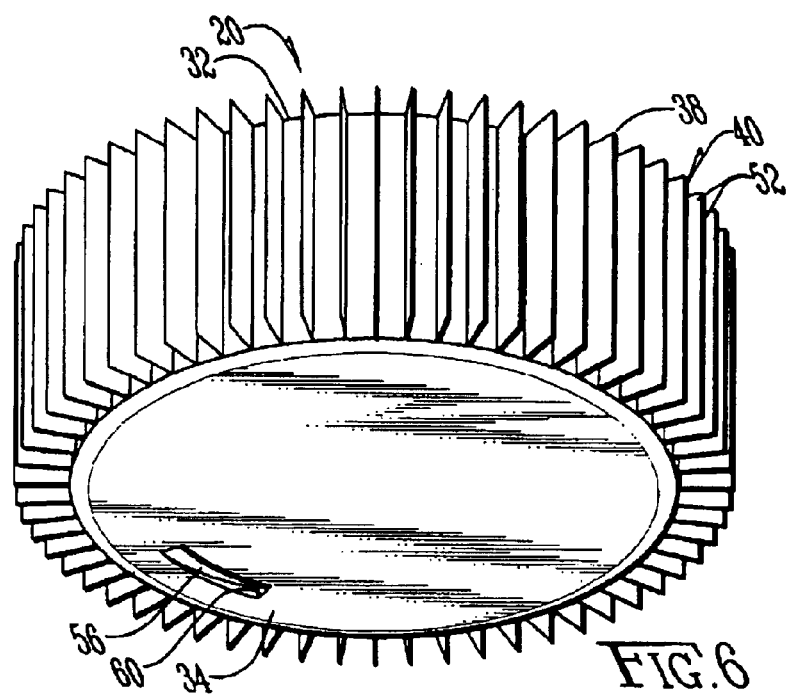
FIG. 6 is a bottom perspective view of the fastener head insert shown in FIG. 1 showing the wedge-shaped recess.

The torque limiting fastener 10 is easily disengaged from a mounted arrangement. For the fastener 10 of FIG. 1, rotation of the fastener head insert 20 in the loosening direction causes the second set of protrusions 40 (e.g., radially-extending vanes 52) to engage the first set of protrusions 28 (e.g., nubs 54) of the fastener body 12 and rotate the body out of the threaded bore of the mounted objects. If the torque value needed to loosen the threaded shaft 14 from the mounted objects equals or exceeds the limiting torque, however, the first and second set of protrusions 28, 40 cannot sufficiently engage to transfer torque and become ineffective. Therefore, as shown in FIGS. 3 and 6, a key 55 and corresponding key-shaped recess 56 are formed on the recessed surface or base 30 of the bore and into the bottom surface 34 of the head insert 20, respectively. In order for key 55 to engage recess 56 only upon rotation of the fastener head insert in the loosening direction, the key is formed as a wedge as shown in FIG. 3. The wedge comprises a ramped lower surface 57 and a mating surface 58. The wedge is formed with a downward slope in the direction of loosening (i.e., counter-clockwise) of the fastener body 12 to properly position a first mating surface 58 for engagement with the wedge-shaped recess 56 of the fastener head insert 20. FIG. 6 shows the recess 56 formed into the head insert bottom surface 34. The recess 56 is shaped to receive wedge 55 when rotationally aligned with the wedge. The recess 56 is an inverted version of the wedge and comprises an inwardly ramping base surface 59 and a wall 60 that extends between the recessed base surface and the head insert bottom surface. A second mating surface 60 is thereby formed to abut the first mating surface 58 such that torque applied to the insert 12 in the loosening direction is directly transferred to the fastener body 12 to overcome the frictional engagement between the threaded shaft 14 and the threaded bore of the mounted objects. Conversely, when the fastener head insert 20 is rotated in the tightening direction, the recess 56 slides over the wedge 55 and the mating surfaces 58, 60 do not engage one another. Thus, the wedge 55 does not interfere with the insert 20 when applying torque in the tightening direction.

Figure 7:
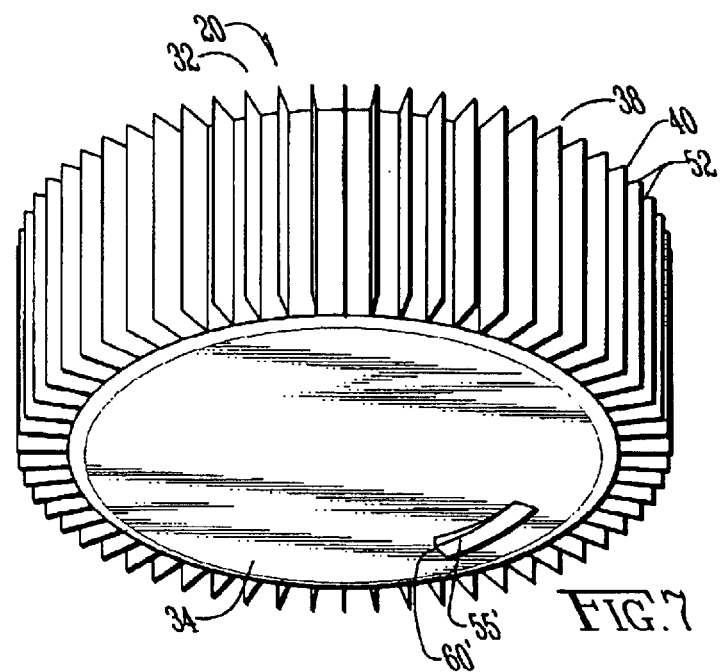
FIG. 7 is a close-up perspective view of another fastener body showing the first set of protrusions and the wedge-shaped recess.
Figure 8:
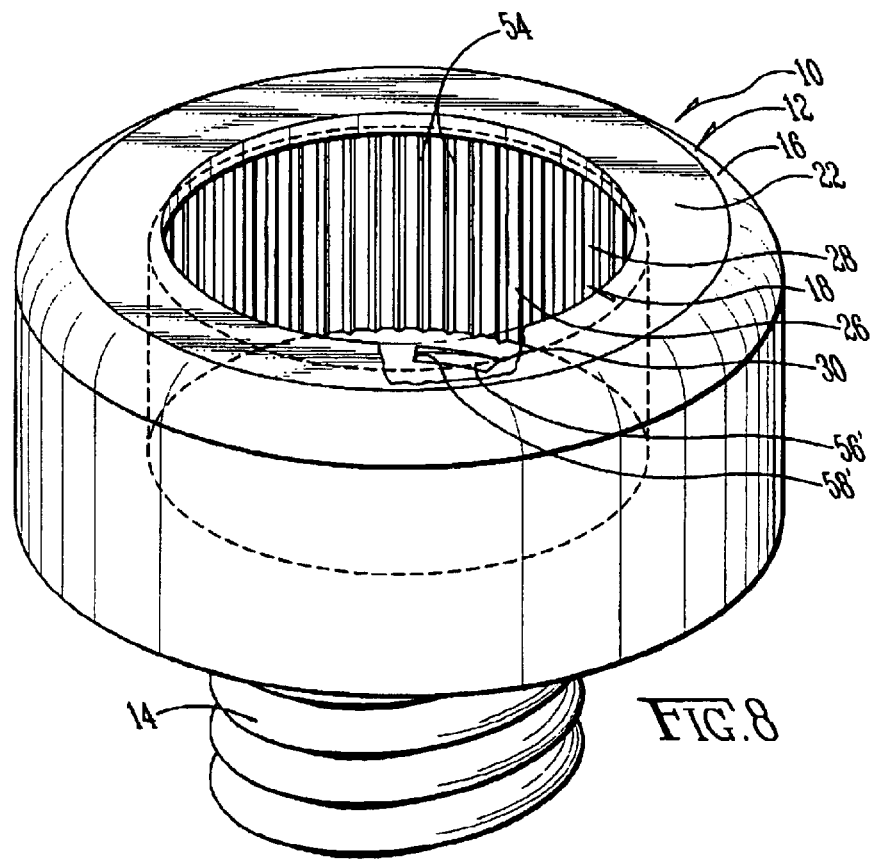
FIG. 8 is a bottom perspective view of another fastener head insert showing the wedge.

FIGS. 7 and 8 show an alternative arrangement where the locations of the wedge 55 and wedge-shaped recess 56 are switched. FIG. 7 shows the fastener body 12 with a wedge-shaped recess 56' formed into the recessed surface 30, and FIG. 8 shows the fastener head insert 20 with a wedge 55' formed on the bottom surface 34. In this arrangement, the wedge 55' and wedge-shaped recess 56' function in the same way as the wedge 55 of FIG. 3 and the wedge-shaped recess 56 of FIG. 6, but with first and second mating surfaces 58', 60' facing the opposite direction.

The torque limiting fastener 10 may be used in any application where screw-type fasteners are used. One example includes the use of the torque limiting fastener 10 to secure a chassis cover onto a computer chassis frame. A variety of materials may be used for the fastener body 12 and fastener head insert 20 depending on the application and necessary torque requirements. Various metals, such as alloy or tool steels, may be used in high-strength applications, whereas plastics may be used to assemble objects together where less strength and torque are necessary. If plastics are used, the fastener body 12 and insert 20 may each be molded as one-piece units.

Since certain changes may be made in the above invention without departing from the scope hereof, it is intended that all matter contained in the above description or shown in the accompanying drawing be interpreted as illustrative and not in a limiting sense. It is also to be understood that the following claims are to cover certain generic and specific features described herein.

What is claimed is:

1. A torque-limiting fastener assembly, comprising:

a fastener body having a threaded shaft and a head, the head having a bore formed therein with a sidewall and a first set of protrusions formed on at least a portion of the sidewall; and a fastener head insert having a perimeter with a second set of protrusions formed on at least a portion thereof for mateable engagement with the first set of protusions, the fastener head insert sized to be fitted within the bore of the fastener body head for rotation therein;

one of the first set of protrusions and the second set of protrusions being operably configured to elastically deform to deflect and slip over the other one of the first set of protrusions and the second set of protrusions upon a limiting torque being applied to the fastener head insert such that the torque transferred from the fastener head insert to the fastener body is limited to a predetermined value as the fastener body is inserted into a threaded bore of an object.

2. The assembly of claim 1, wherein the sidewall of the bore is cylindrically shaped, and the perimeter of the fastener head insert has a corresponding cylindrical shape.

3. The assembly of claim 1, wherein the first set of protrusions are a set of nubs and the second set of protrusions are a set of radially-extending vanes, the set of vanes being deflectable over the set of nubs at a specific torque value.

4. The assembly of claim 1, wherein the second set of protrusions are a set of nubs and the first set of protrusions are a set of radially-extending vanes, the set of vanes being deflectable over the set of nubs at a specific torque value.

5. The assembly of claim 1, wherein the fastener head insert has an inner wall defined by a series of alternating ridges and troughs extending towards and away from an axial centerline of the insert.

6. The assembly of claim 5, wherein the ridges and troughs have a curved profile.

7. The assembly of claim 1, wherein the fastener body head has a top surface, and further comprising:

a flange extending from the top surface, the flange being configured to be crimped at least partially over the fastener head insert to maintain the fastener head insert within the bore.

8. The assembly of claim 1, wherein the bore of the fastener body defines a generally planar recessed surface and the fastener head insert has a bottom surface that abuts the recessed base surface, and further comprising:

a wedge formed on the recessed surface of the fastener body; and a wedge-shaped recess formed into the bottom surface of the fastener head insert and configured to mate with the wedge of the fastener body;

wherein the rotation of the insert in a direction to loosen the fastener body from the threaded bore with a torque load sufficient to cause one of the first set of protrusions and the second set of protrusions to deflect and slip over the other one of the first set of protrusions and the second set of protrusions thereby causes the wedge and mating wedge-shaped recess to engage and turn the fastener body.

9. The assembly of claim 1, wherein the bore of the fastener body defines a generally planar recessed surface and the fastener head insert has a bottom surface that abuts the recessed base surface, and further comprising:
  a wedge formed on the bottom surface of the fastener head insert; and
  a wedge-shaped recess formed into the recessed surface of the fastener body and configured to mate with the wedge of the fastener head insert;
  wherein the rotation of the insert in a direction to loosen the fastener body from the threaded bore with a torque load sufficient to cause one of the first set of protrusions and the second set of protrusions to deflect and slip over the other one of the first set of protrusions and the second set of protrusions thereby causes the wedge and mating wedge-shaped recess to engage and turn the fastener body.

10. The assembly of claim 1, wherein the fastener head insert is made of plastic.

11. A fastener assembly for selectively limiting the amount of torque that may be applied thereto, comprising:
  a fastener body comprising a threaded shaft and a head formed with the shaft, the head having a top surface with a bore extending inward from the top surface and coaxial with the threaded shaft, the bore defining a recessed surface and an inner sidewall on which a first set of protrusions are formed; and
  a cylindrically-shaped insert having a second set of protrusions formed around a perimeter thereof for engaging and transferring torque to the first set of protrusions, the fastener head insert sized to be fitted within the bore of the fastener body head for rotation therein;
  wherein one of the first set of protrusions and the second set of protrusions is configured to deflect and slip over the other one of the first set of protrusions and the second set of protrusions when a sufficient torque is applied to the cylindrically-shaped insert such that the torque transferred from the insert to the fastener body is limited to a predetermined value as the fastener body is inserted into a threaded bore of an object.

12. The assembly of claim 11, wherein the first set of protrusions are a set of nubs and the second set of protrusions are a set of radially-extending vanes, the set of vanes being deflectable over the set of nubs at a specific torque value.

13. The assembly of claim 11, wherein the second set of protrusions are a set of nubs and the first set of protrusions are a set of radially-extending vanes, the set of vanes being deflectable over the set of nubs at a specific torque value.

14. The assembly of claim 11, wherein the insert has an inner wall defined by a series of alternating ridges and troughs extending towards and away from an axial centerline of the insert.

15. The assembly of claim 14, wherein the ridges and troughs have a curved profile.

16. The assembly of claim 11, further comprising a flange extending from the top surface of the fastener body head, the flange being configured to be crimped at least partially over the fastener head insert to maintain the fastener head insert within the bore.

17. The assembly of claim 11, wherein the insert has a bottom surface that abuts the recessed surface of the fastener body, and further comprising:
  a wedge formed on the recessed surface; and
  a wedge-shaped recess formed into the bottom surface of the insert and configured to mate with the wedge;
  wherein the turning of the insert in a direction to loosen the fastener body from the threaded bore with a torque load sufficient to cause one of the first set of protrusions and the second set of protrusions to deflect and slip over the other one of the first set of protrusions and the second set of protrusions thereby causes the wedge and mating recess to engage and turn the fastener body.

18. The assembly of claim 11, wherein the insert has a bottom surface that abuts the recessed surface of the head, and further comprising:
  a wedge formed on the bottom surface of the insert; and
  a wedge-shaped recess formed into the base surface and configured to mate with the wedge;
  wherein the turning of the insert in a direction to loosen the fastener body from the threaded bore with a torque load sufficient to cause one of the first set of protrusions and the second set of protrusions to deflect and slip over the other one of the first set of protrusions and the second set of protrusions thereby causes the wedge and mating recess to engage and turn the fastener body.

19. The assembly of claim 11, wherein the fastener body and insert are both made of plastic.

* * * * *